(12) United States Patent
Dumas (10) Patent No.: US 11,832,145 B2
(45) Date of Patent: Nov. 28, 2023

(54) METHODS AND SYSTEMS FOR LOCATION-BASED FEATURES USING PARTITION MAPPING

(71) Applicant: DUMAS HOLDINGS LLC, Great Falls, VA (US)

(72) Inventor: Mark Dumas, Great Falls, VA (US)

(73) Assignee: DUMAS HOLDINGS LLC, Great Falls, VA (US)

( * ) Notice: Subject to any disclaimer, the term of this patent is extended or adjusted under 35 U.S.C. 154(b) by 0 days.

(21) Appl. No.: 17/179,740

(22) Filed: Feb. 19, 2021

(65) Prior Publication Data

US 2022/0272482 A1  Aug. 25, 2022

(51) Int. Cl.
*H04W 4/021* (2018.01)
*G06Q 50/16* (2012.01)
*H04W 4/35* (2018.01)

(52) U.S. Cl.
CPC .......... *H04W 4/022* (2013.01); *G06Q 50/163* (2013.01); *H04W 4/35* (2018.02)

(58) Field of Classification Search
CPC ....... H04W 4/022; H04W 4/35; G06Q 50/163
See application file for complete search history.

(56) References Cited

U.S. PATENT DOCUMENTS

| | | | | |
|---|---|---|---|---|
| 2,393,676 | A * | 1/1946 | Fuller | G09B 27/08 434/135 |
| 5,222,896 | A * | 6/1993 | Smith, Jr. | G09B 29/005 434/137 |
| 2002/0166294 | A1* | 11/2002 | Rogers | E04B 7/22 52/81.4 |
| 2009/0123088 | A1* | 5/2009 | Kallay | G06T 3/0062 382/295 |
| 2014/0267261 | A1* | 9/2014 | Samavati | G06T 17/20 345/423 |
| 2015/0281887 | A1* | 10/2015 | Johnson | H04W 4/021 455/456.3 |
| 2017/0308549 | A1* | 10/2017 | Sims | G06Q 50/167 |
| 2018/0295563 | A1* | 10/2018 | Lisewski | H04W 4/026 |
| 2021/0127225 | A1* | 4/2021 | Viitala | G01S 5/0252 |
| 2022/0164830 | A1* | 5/2022 | Kang | H04W 4/022 |

\* cited by examiner

*Primary Examiner* — Ernest G Tacsik
(74) *Attorney, Agent, or Firm* — Pillsbury Winthrop Shaw Pittman LLP (57) ABSTRACT

Methods and systems are described of location-based features using partition mapping. For example, the system may receive a user request for a location-based feature corresponding to a first location. The system may then determine a global-positioning coordinate of the first location and a first set of global-positioning coordinates defining a first grid partition in a global partition map, wherein a shape of the first grid partition corresponds to a polygonal face of a spherical polyhedral. The system may then determine whether the global-positioning coordinate is located within the first set of global-positioning coordinates. The system may then, in response to determining that the global-positioning coordinate is located within the first set of global-positioning coordinates, determine that the first location corresponds to the first grid partition. The system may then retrieve a first data profile for the first grid partition and generating for display, in a user interface, the location-based feature based on the first data profile.

22 Claims, 7 Drawing Sheets

METHODS AND SYSTEMS FOR LOCATION-BASED FEATURES USING PARTITION MAPPING

BACKGROUND OF THE DISCLOSURE

In recent years, the use of location-based indexing for computer data has become instrumental in implementing both front-end and back-end computing features/architectures. For example, mobile applications routinely rely on customizing and directing information to a user based on the user's location. These mobile applications tend to rely on point-to-point distances and point locations as opposed to geospatial or geofenced arrangements, accordingly when mobile applications map a device location to addresses (e.g., streets, buildings, etc.), the position and/or relationship to address may be incorrect. In another example, data distribution and authorization schemes often rely on network addresses and other means for locating geographically where a computer device resides. The use of such networks is limited as the network addresses and underlying schemes are based upon government-sourced location and jurisdictional boundaries (e.g., countries, counties, zip codes, etc.), which may change over time and thus create downstream errors and inefficiencies.

In yet another example, the efficiency of data processing, particularly in parallel processing environments, for exponentially increasing dataset sizes, using cloud distributed computing architectures is fundamentally limited by the efficiency of the algorithm used to partition that data for distributed storage and processing on multiple computing nodes. For example, balancing network loads ensures that each processor has an equal load and that the networks will be ready to communicate at the same time. Since communication between areas (or networks) can be a relatively time-consuming process, minimizing the number of interfaces between networks may reduce the time associated with this data interchange. Minimizing the number of network neighbors may also reduce the chances for network and routing contentions. In addition, minimizing network neighbors is important on system where the cost of initiating message passing is expensive compared to the cost of sending longer messages. Efficiently distributing these large data sets, and the processing for these large data sets based on geospatial locations, have proven problematic because conventional geospatial location representations (e.g., vectors of floating point numbers representing latitude/longitude, planar/cartesian map coordinates, and/or government-sourced information) do not provide a global alphanumeric location index keys required for efficient distribution.

SUMMARY OF THE DISCLOSURE

Methods and systems are disclosed herein for addressing one or more of the problems above through the use of location-based features using partition mapping. For example, a common thread of the front-end and back-end computing application/architecture issues discussed above is the reliance on local geographic address information, typically provided by governmental (e.g., registered), commercial, or other organizational sources or based on natural features. This creates a fundamental design flaw in the front-end and back-end computing features/architectures. For example, in the United States (and other countries that use similar address schemes), despite the geographic derivation of most ZIP codes, the codes themselves do not represent geographic regions. These codes, which many conventional computer systems rely on for address information as a means for indicating geographic location, are not an indicator of geographic location. Instead, these codes correspond to address groups or delivery routes of a governmental mail distribution scheme. Accordingly, these codes, and the geographic areas to which they refer, can overlap, be subsets of each other, or be artificial constructs with no relationship to a geographic area. Likewise, in areas without regular delivery routes (e.g., rural or undeveloped areas), these codes may not be assigned, and/or the boundaries between areas subject to one code or another may not be defined and/or may be vastly non-uniform in size. In another example, local address information based on roads, landmarks, or natural features (e.g., rivers, coastlines, etc.) may create similar issues as the underlying roads, landmarks, or natural features (or their boundaries) change over time.

Accordingly, methods and systems for powering location-based features in front-end and back-end computing applications/architectures using partition mapping is described herein. In particular, the location-based features are powered through global-positioning coordinates, however, in contrast to conventional global-positioning systems that rely on interpreting global-positioning coordinates through local address information, the methods and systems use sets of global-positioning coordinates defining grid partitions in a global partition map. For example, interpreting global-positioning coordinates through local address information creates a problem in that the local address information is based on rectangular and planar regions. Using this information to describe the topologically spherical Earth causes distortions to arise. In mobile applications, these distortions may arise through a mobile map application indicating a user is not at an address (or next to a road) when, in fact, the user is at the address. In back-end processing, these distortions may result in the data processing system attributing data sets to incorrect location bases or routing information through incorrect network nodes. In particular, the methods and systems describe the use of global-position coordinates that reference multi-resolution, geospatial grid partitions that are based on indexing the spherical Earth. For example, the methods and systems describe the use of sets of global-positioning coordinates defining grid partitions in which a shape of the grid partitions corresponds to a polygonal face of a spherical polyhedral. The index keys may include alphanumeric labels such as "A1B2," "1113," or "AACEF."

The use of sets of global-positioning coordinates defining grid partitions, in which a shape of the grid partitions corresponds to a polygonal face of a spherical polyhedral, cures the discrepancies created when interpreting global-positioning coordinates through local address information. Likewise, the use of the methods and systems based on these grid partitions relieves the issues related to front-end and back-end computing applications/architectures. The methods and systems discussed herein are therefore able to provide globally consistent and temporally reliable location-based features. Moreover, each grid partition is itself further partitionable such that the methods and systems described herein may be zoomed-in and/or zoomed-out to varying levels of resolution and/or precision depending on the needs of an application. Notably, the grid partitions with different levels of resolution maintain the globally consistent and temporally reliable location-based features.

In one aspect, methods and systems for generating location-based features using partition mapping are described. For example, the system may receive a user request for a location-based feature corresponding to a first location. The system may then determine a global-positioning coordinate of the first location and a first set of global-positioning coordinates defining a first grid partition in a global partition map wherein a shape of the first grid partition corresponds to a polygonal face of a spherical polyhedral. The system may then determine whether the global-positioning coordinate is located within the first set of global-positioning coordinates. The system may then, in response to determining that the global-positioning coordinate is located within the first set of global-positioning coordinates, determine that the first location corresponds to the first grid partition. The system may then retrieve a first data profile for the first grid partition and generating, for display in a user interface, the location-based feature based on the first data profile.

Various other aspects, features, and advantages of the invention will be apparent through the detailed description of the invention and the drawings attached hereto. It is also to be understood that both the foregoing general description, and the following detailed description are examples, and not restrictive of the scope of the invention. As used in the specification, and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DISCLOSURE

In the following description, for the purposes of explanation, numerous specific details are set forth in order to provide a thorough understanding of the embodiments of the invention. It will be appreciated, however, by those having skill in the art that the embodiments of the invention may be practiced without these specific details, or with an equivalent arrangement. In other cases, well-known structures and devices are shown in block diagram form in order to avoid unnecessarily obscuring the embodiments of the invention.

Figure 1:
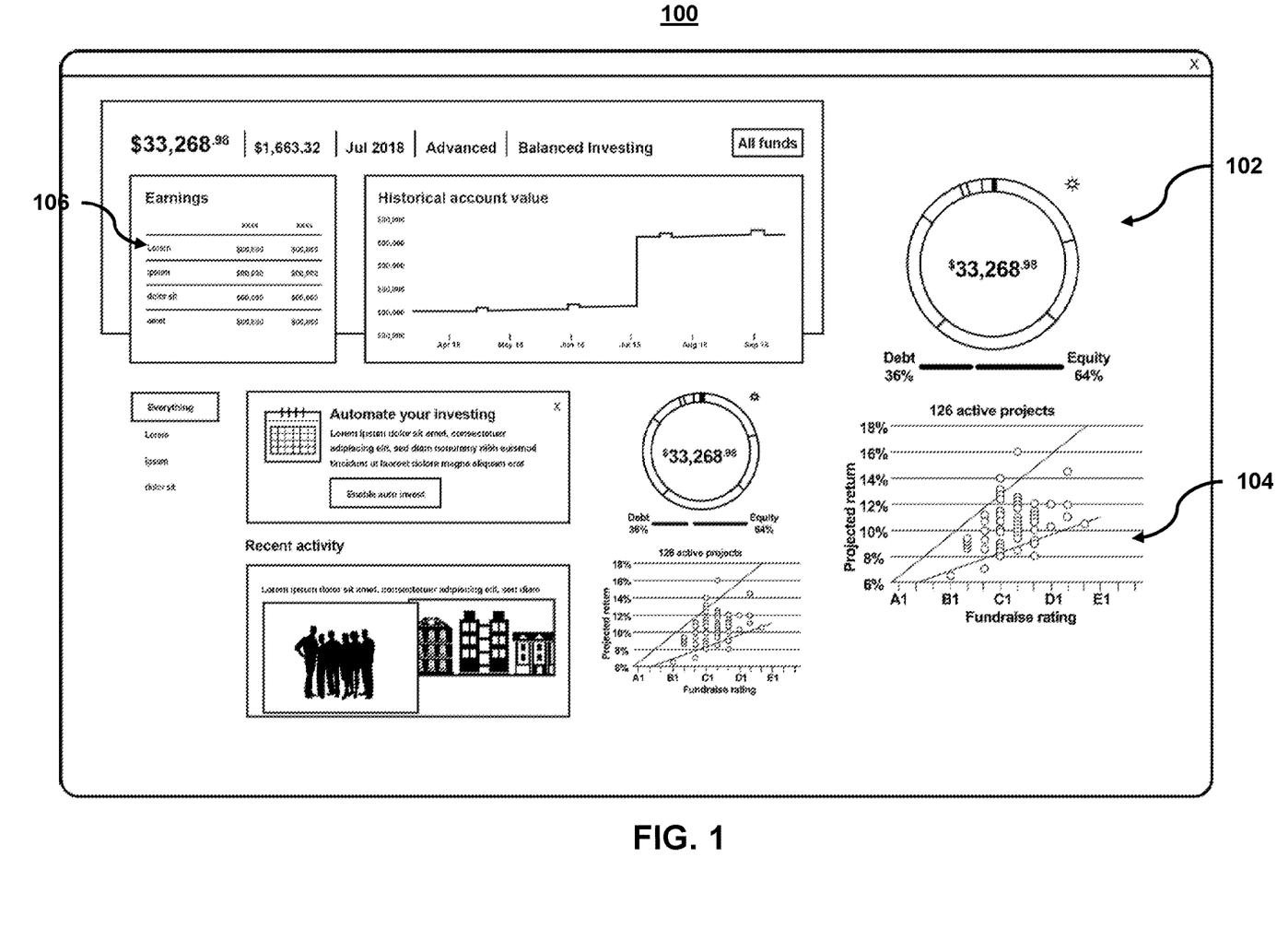
FIG. 1 shows a user interface for accessing location-based features using partition mapping in accordance with one or more embodiments.

FIG. 1 shows a user interface for accessing location-based features using partition mapping in accordance with one or more embodiments. For example, FIG. 1 shows a user interface for accessing location-based features using partition mapping such that the location-based features provide globally consistent and temporally reliable location-based features. It should be noted that user interface 100 in FIG. 1 describes one, non-limiting embodiment of location-based features and that other embodiments and location-based features are within the scope of this application.

FIG. 1 shows user interface 100. User interface 100 includes a plurality of windows and location-based features representative of one or more data profiles for one or more grid partitions. As referred to herein, a data profile may include a collection of information from an information source (e.g., a database, file, and/or system). In some embodiments, the data profile may include any data that may be used for data profiling (e.g., collecting statistics, determining correlations, targeting user for recommendations (e.g., based on the data), compiling data from disparate sources, and/or informative summaries about one or more grid partitions.).

In some embodiments, user interface 100 may comprise a dashboard of information used to manage, compare, and/or review the data profile for one or more grid partitions. For example, user interface 100 may represent a portal for accessing an online exchange for reviewing information, trading securities, etc. based on grid partitions. For example, due to the globally consistent, and temporally reliable location-based features, the system may provide a system for real estate investment fund opportunity that offers diversification both geographically, and across the set of underlying assets, by pooling assets in high performant groups at sub-zip code granularity. The consistency of the grid partitions (and the consistencies of their boundaries) may provide long-term reliable indexing for each grid partition though which data may be aggregated into a data profile. For example, summary information 106 may provide information about uniquely identifiable grid partitions. Summary information 106 may provide a name, serial number stock symbol, and/or other information used to identify the grid partition (and/or its placement in the plurality of grid sub-partitions). Likewise, graphical element 102 may provide comparisons of information about multiple grid partitions based on global partition mapping. Recommendation 104 may provide information about future projections and/or historical information. Additionally, or alternatively, user interface 100 may include additional content, such as location-based information related to one or more grid partitions.

For example, user interface 100 may provide a news feed, information feed, or risk-related feed related to the grid partition. In another example, user interface 100 may push notifications surrounding purchasing opportunities, travel alerts, or temporally relevant information about upcoming events in the grid partition. In another example, user interface 100 may provide and/or receive micro-blogging feeds related to the grid partition. In another example, user interface 100 may provide augmented reality in conjunction with global-positioning systems, location sensors and geospatial data, for the grid partition. In one embodiment, a user may visualize the geospatial data on the surface of the real world using augmented reality—capable eyewear.

Figure 2:
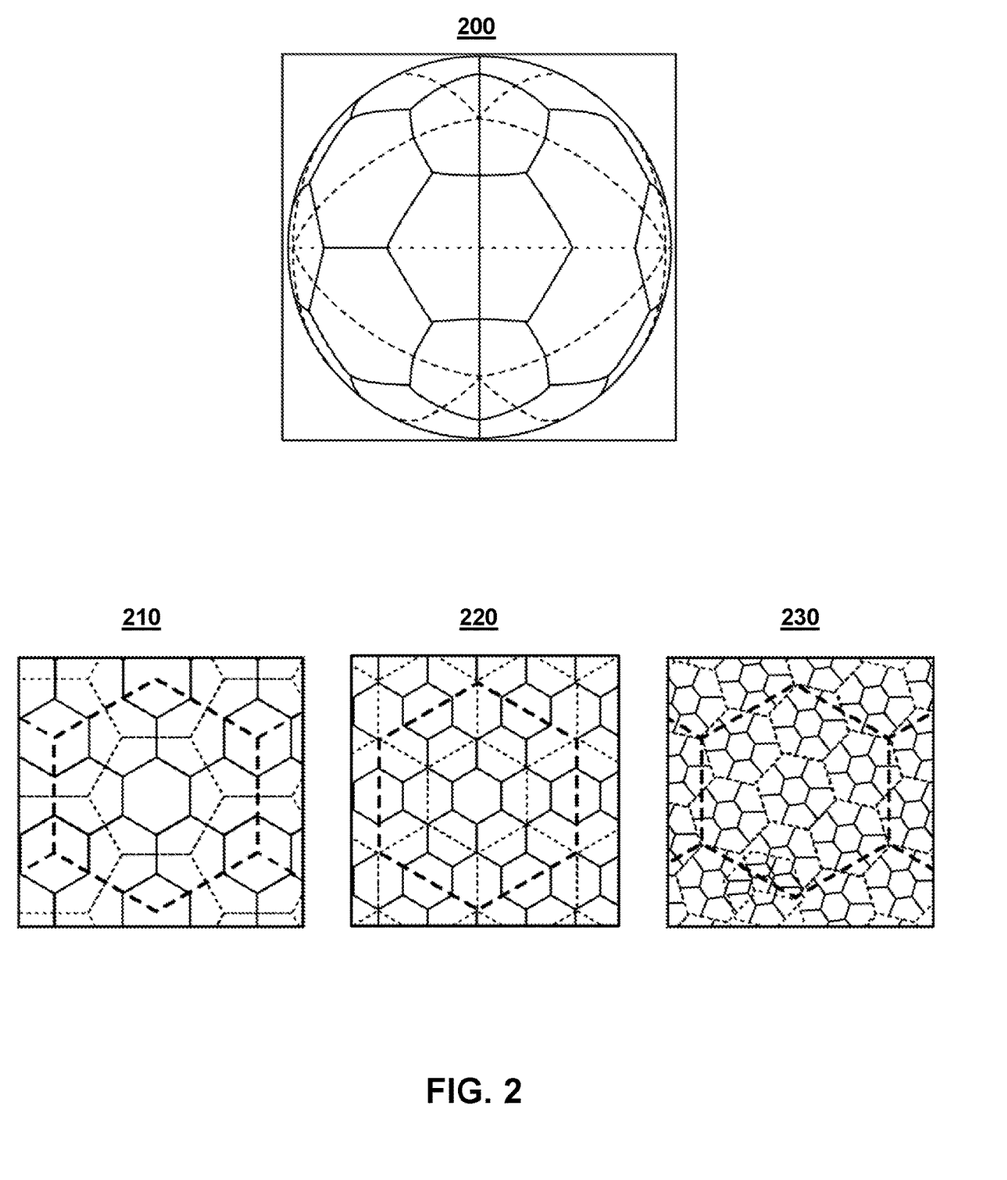
FIG. 2 shows illustrative diagrams of partition mappings in accordance with one or more embodiments.

FIG. 2 shows illustrative diagrams of partition mappings, in accordance with one or more embodiments. For example, the partition mappings and resulting grid partitions may include identifiable information that appears in user interface 100 (FIG. 1). In some embodiments, FIG. 2 describes the use of sets of global-positioning coordinates defining grid partitions in which a shape of the grid partitions corresponds to a polygonal face of a spherical polyhedral.

For example, in some embodiments, the system may generate the spherical polyhedral corresponding to the Earth (e.g., as shown in diagram 200), wherein the spherical polyhedral has a plurality of polygonal faces corresponding to a surface area of the Earth. Diagram 200 further shows the shapes and sizes of the spherical polyhedral such as hosohedron, icosahedron, etc. as well as improper polyhedra, such as the hosohedra and dihedra. For example, in order to minimize distortions between planar/cartesian coordinates, the system may generate the partition mappings based on an icosahedron as a base polyhedron. For example, the icosahedron may provide the smallest face size amongst the platonic solids and hence the smallest distortion amongst equivalent face-centered polyhedral projections (which may be used for defining a shape of the grid partition).

The system may also assign each of the plurality of polygonal faces to a respective grid partition of the plurality of grid sub-partitions. For example, the system may use polygons featuring one or more shapes for partitioning the polygonal faces, although in some embodiments the use of grid partitions with consistent sizes may be useful. In some embodiments, hexagons may be used for multi-resolution gridding and location representation. Among the three regular polygons that tile the plane (e.g., triangles, pentagons, squares, and hexagons), hexagons may be the most compact, and hexagons quantize (e.g., cover the plane with the fewest gaps in coverage such that the sum of the surface area of the hexagons closely matches the sum of the surface area of the Earth) the plane with the smallest average error. It should also be noted that the Earth is only considered planar is highly localized situations. Accordingly, the system may adjust the polygons into nonplanar variations to partition nonplanar surfaces. The system may determine the degree to which the polygon is nonplanar based on the size of the polygon (e.g., either in absolute terms or respective to the size of the Earth). Moreover, as opposed to square and triangular grids, hexagonal grids display uniform adjacency. For example, each cell in a grid of hexagons has six neighbors, all of which share an edge, and all of which have centers at a constant distance away from its center. These features may be particularly relevant as location-based features may, in some embodiments, be keyed to distances from one grid to another, distances to a center of a grid, or rely on converting location information. In some embodiments, the system may mix polygons. For example, the system may have "keystone" polygons at one or more resolutions surrounded by polygons. For example, the system may have 12 pentagon polygons at each resolution that is surround by hexagons.

For example, each of the first plurality of grid sub-partitions may be further partitionable into a second plurality of grid sub-partitions, wherein each of the second plurality of grid sub-partitions has the shape of the first grid partition. For example, hexagons, as shown in diagrams 210, 220, and 230 may include varying resolution ratios. These ratios may include three to one (e.g., as in diagram 210), four to one (e.g., as shown in diagram 220), or seven to one (e.g., as shown in diagram 230). Each ratio may represent a recursive method for viewing partition grids at different resolutions. In some embodiments, these resolutions may be used to convert location information from a format used by a registered or governmental source (or other source), and/or generating grid partitions at varying degrees of granularity. For example, using resolutions with a ratio of seven to one allows for geometrically and numerically consistent grid partitions as resolutions are made larger or smaller. Additionally, a ratio of seven to one is the most geometrically efficient choice for partitioning each grid. The use of geometric efficiencies may further reduce distortions.

In some embodiments, the system may include elevation dimensions and use the elevation dimension for grid partitions. For example, the system may record a Z—location (or elevation) that resolves to a grid partition above a ground level partition. The grid partition above the ground level partition may increase in size with altitude (e.g., distance above ground level, sea level of the Earth, etc.). The system may thus form semi-cone-like shapes as the elevation increases. The system may also recompute the partitions with an artificially increasing diameter and dimensionality of the Earth, so as to recalculate the partitions at varying elevations.

The system may determine the first plurality of sets of global-positioning coordinates defining each of the plurality of grid sub-partitions. For example, the system may determine the global-positioning coordinates defining the boundaries of the plurality of grid sub-partitions. As the sets of global-positioning coordinates defining grid partitions are based on a global partition map, the location-based feature minimizes the distortions present in global-positioning systems that rely on interpreting global-positioning coordinates through local address information.

As referred to herein, local address information (or location information) may refer to location information based on traditional governmental (e.g., registered), commercial, non-government organization, or natural sources that are themselves based on planar or cartesian coordinates. For example, location information may include addresses, jurisdictional boundaries (e.g., demarcating countries, regions, towns, zip codes, streets property lines, etc.), landmarks, and/or other boundaries established by registered or governmental sources. Location information may also include addresses of jurisdictional boundaries established by natural features (e.g., rivers, coastlines, etc.). It should be noted that as referred to herein in some embodiments, a governmental source (e.g., a registered source) may be based on information provided/determined by a commercial or non-governmental organization. For example, the system may further partition each partition into a substantially equal size and/or shape based on certain physical attributes (e.g., a number of homes, roads, and/or global coordinates).

The system may define the boundaries of the plurality of grid sub-partitions using data from a global-positioning system (or other system for determining global coordinates) that provides geolocation and time information to a global-positioning system receiver. In the global-positioning system, each global-positioning system satellite may continually broadcast a signal (e.g., a carrier wave with modulation) that includes a pseudorandom code (sequence of ones and zeros) that is known to the receiver and a message that includes the time of transmission. The system may time-align a receiver-generated version and the receiver-measured version of the code, and the time of arrival of a defined point in the code sequence. The system may then determine time offset of the received code to determine a distance. The system may then convert the distances into the boundaries of the plurality of grid sub-partitions as well as global-positioning coordinates of a location. The system may also use metrics based on elevation as described above.

In some embodiments, the system may use a partitioning algorithm, which has a goal of one or more of the following: creating partitions with equal numbers of cells; decreasing partition boundary surface area; and or minimizing the number of partition neighbors. Balancing the partitions (equalizing the number of cells) may ensure that each processor has an equal load and/or that computations related to the partitions will be ready to communicate at about the same time. In some embodiments, the system may minimize the variance of other metrics (e.g., an initial value of content within a partition). For example, the system may then receive instructions to raise and/or lower a level of magnification and/or amount of zoom. In response, the system may adjust the number of partitions and/or sub-partitions that are selected. The system may then generate determinations based on selected partitions and/or sub-partitions.

In some embodiments, the selected algorithm is applied to a parent partition, and then recursively applied to the child sub-partitions. For example, to divide the grid into four partitions, the system may bisect the entire (parent) partition into two child partitions, and then repeat the bisection for each of the child partitions, yielding four partitions in total. To divide the grid into three partitions, the system will bisect the parent partitions to create two partitions, one approximately twice as large as the other, and then bisect the larger child partition again to create three partitions in total. The system may use a variety of bisection algorithms such as bisects the partition based on the Cartesian coordinates, cylindrical axes, polar axes, and/or spherical axes. In some embodiments, the system may use a multilevel approach in which the vertices and edges on a fine graph are coalesced to form a coarse graph. The coarse graph is partitioned, and then uncoarsened back to the original graph. During coarsening and uncoarsening, algorithms are applied to permit high-quality partitions. For example, the system may further partition each parent partition into child partition that are a substantially equal size and/or shape. Moreover, the shape of the child partition may be substantially equal to the shape of the parent partition.

In some embodiments, additional optimizations may be applied to improve the quality of the grid partitions. For example, a pre-testing operation (e.g., testing different directions before performing the actual bisection) may be applied to automatically choose the best direction before partitioning. In addition, the following iterative optimization schemes exist of smoothing and merging exist. For example, smoothing minimizes the number of partition interfaces by swapping cells between partitions. Merging eliminates orphan clusters from each partition. An orphan cluster is a group of cells with the common feature that each cell within the group has at least one face which coincides with an interface boundary.

Figure 3:
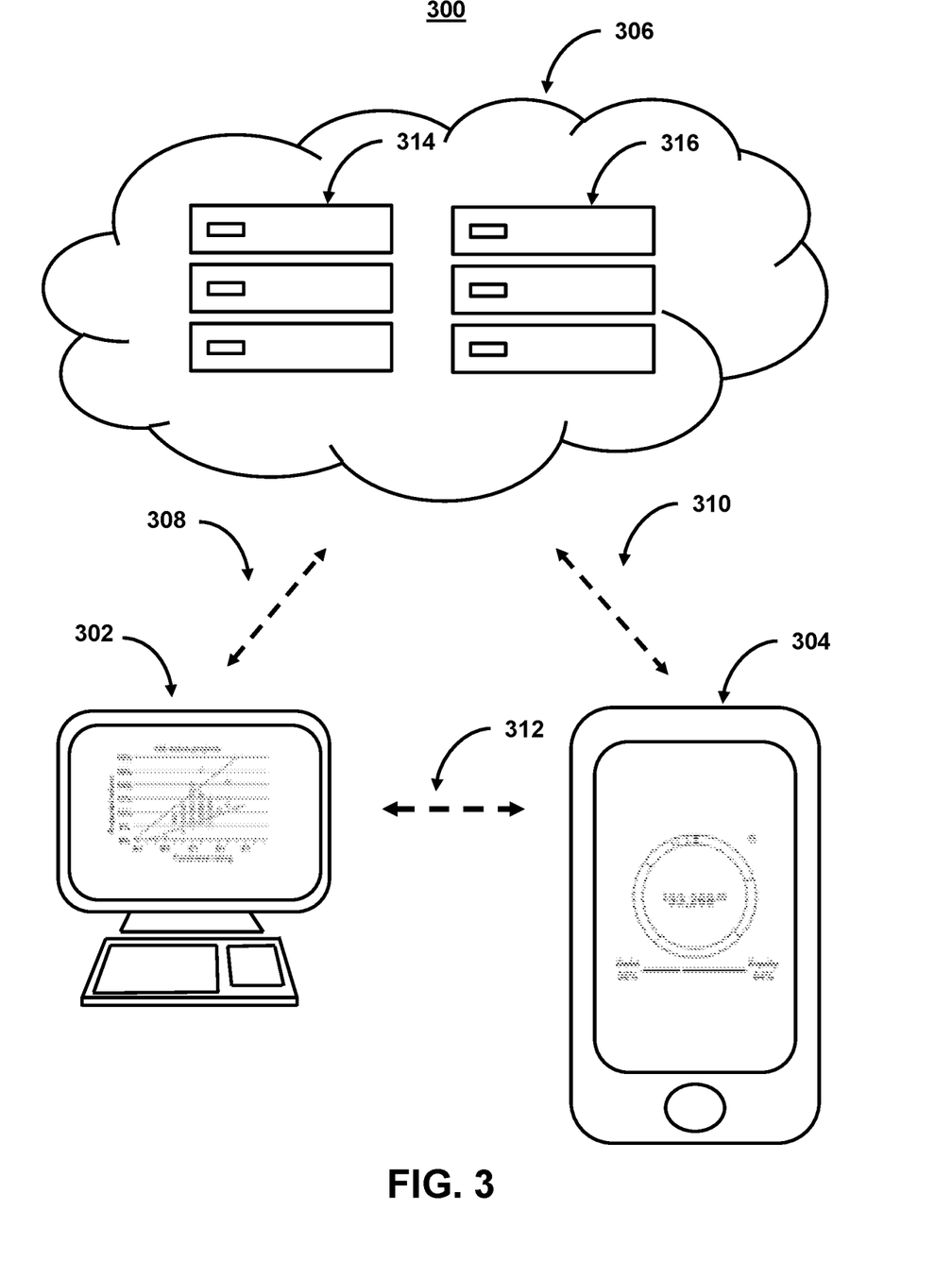
FIG. 3 shows an illustrative system for accessing location-based features using partition mapping in accordance with one or more embodiments.

FIG. 3 shows a system 300 for provisioning cloud services, in accordance with one or more embodiments. As shown in FIG. 3, system 300 may include client device 302, client device 304 (or client devices 304a-304n), or other components. Each of client devices 302 and 304 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 302 and 304 may include a desktop computer, a notebook computer, a tablet computer, a smartphone, a wearable device, or other client device. Users may, for instance, utilize one or more client devices 302 and 304 to interact with one another, one or more servers, or other components of system 300. It should be noted that, while one or more operations are described herein as being performed by particular components of client devices 302 or 304, those operations may, in some embodiments, be performed by other components of client devices 302 or 304 or other components of system 300. As an example, while one or more operations are described herein as being performed by components of client device 302, those operations may, in some embodiments, be performed by components of client device 304.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 308, 310, and 312. Communication paths 308, 310, and 312 may include the Internet, a mobile phone network, a mobile voice or data network (e.g., a 4G or LTE network), a cable network, a public switched telephone network, or other types of communications network or combinations of communications networks. Communication paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

The computing devices may include additional communication paths linking a plurality of hardware, software, and/or firmware components operating together. For example, the computing devices may be implemented by a cloud of computing platforms operating together as the computing devices. For example, client device 302 may represent the client device of a first cloud services recipient. For example, the cloud service may be made available to multiple client devices (e.g., end users) on demand via the Internet (e.g., path 308 or 310) from a cloud services provider's servers (e.g., server 314 and server 316) as opposed to end users using servers at the end user's location and/or owned by the end user. It should be noted that cloud service 306 includes servers 314 and server 316; however, cloud service 306 may include additional components. In some embodiments, server 314 and server 316 may represent edge servers that are geographically close to a represent client device. In such embodiments, edge server 314 and edge server 316 may be further connected to a central server in cloud service 306. The central server may assign and select server 314 and/or server 316 to a given client device, application, and/or end user based on the geographic location of the client device with respect to the edge server, based on the network conditions along a given network path, and/or other quality of service conditions on the network.

System 300 may be structured according to one or more service-oriented architecture models. For example, system 300 may be designed to provide easy, scalable access to applications, resources, and services, as well as to fully manage a cloud services provider. In particular, system 300 may dynamically scale to meet the needs of client device 302 and client device 304. In some embodiments, the cloud service 306 may supply some or all cloud resources (e.g., hardware and software necessary for all or some of the operation of one or more cloud services) to cloud services recipient. The cloud services provider may provide cloud services such as online data storage and backup solutions, Web-based e-mail services, hosted office suites and document collaboration services, database processing, managed technical support services, and/or general computer power and data processing. In some embodiments, the cloud resource may be a network, server, storage device, application, and/or service.

Figure 4:
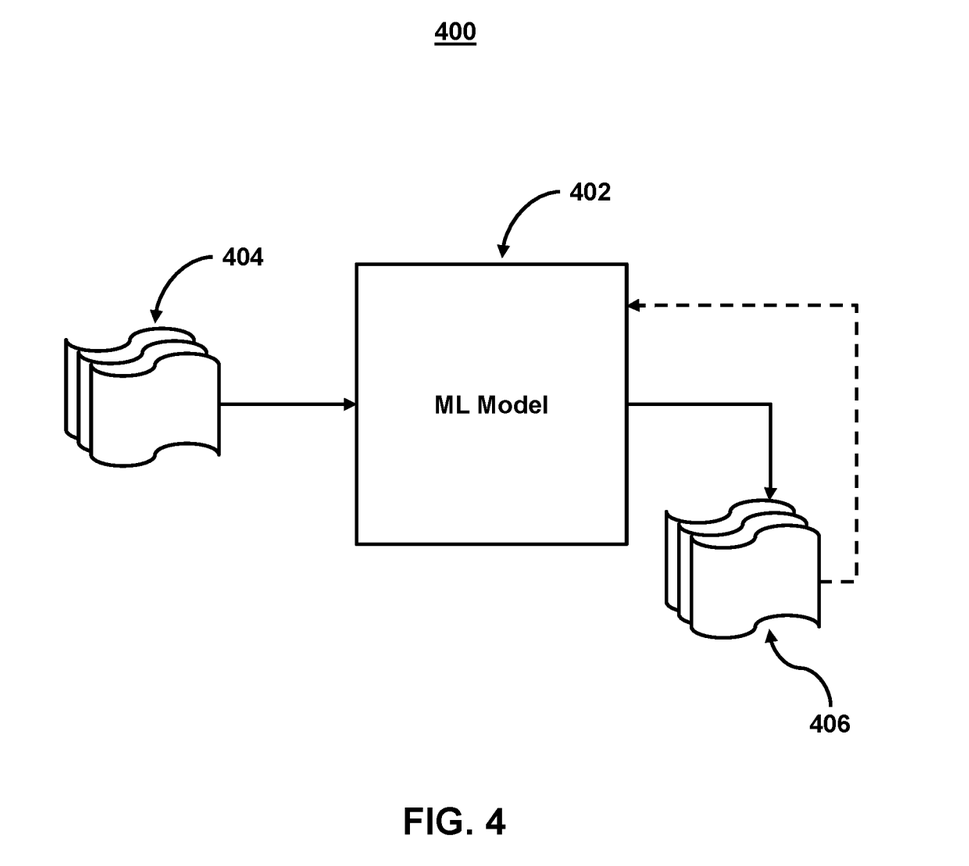
FIG. 4 shows an illustrative system a machine-learning model for generating partition mappings accessing location-based features using partition mapping in accordance with one or more embodiments.

FIG. 4 shows an illustrative system a machine-learning model for generating partition mappings accessing location-based features using partition mapping in accordance with one or more embodiments. In some embodiments, system 400 may use one or more models (e.g., FIG. 4 below) to generate a partition map, detect/assign a global-positioning coordinate of a location, recursively examine location information for various locations around the world and assign each location to a given grid partition, define a set of global-positioning coordinates defining a first grid partition in a global partition map, and/or generating one or more location-based features (e.g., FIG. 1). For example, the model may include one or more neural networks or other machine learning models. Neural networks may be based on a large collection of neural units (or artificial neurons) and may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function, which combines the values of all of its inputs together, while in others, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks where forward stimulation is used to reset weights on the "front" neural units, while in others, stimulation and inhibition for neural networks may be more free-flowing, with connections interacting in a more chaotic and complex fashion.

Machine learning model 402 may take inputs 404 and provide outputs 406. For example, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine-learning model 402 is a neural network, connection weights may be adjusted to reconcile differences between the neural network's prediction and the reference feedback. In a further use case, one or more neurons (or nodes) of the neural network may require that their respective errors are returned to them through the neural network to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

Figure 5:
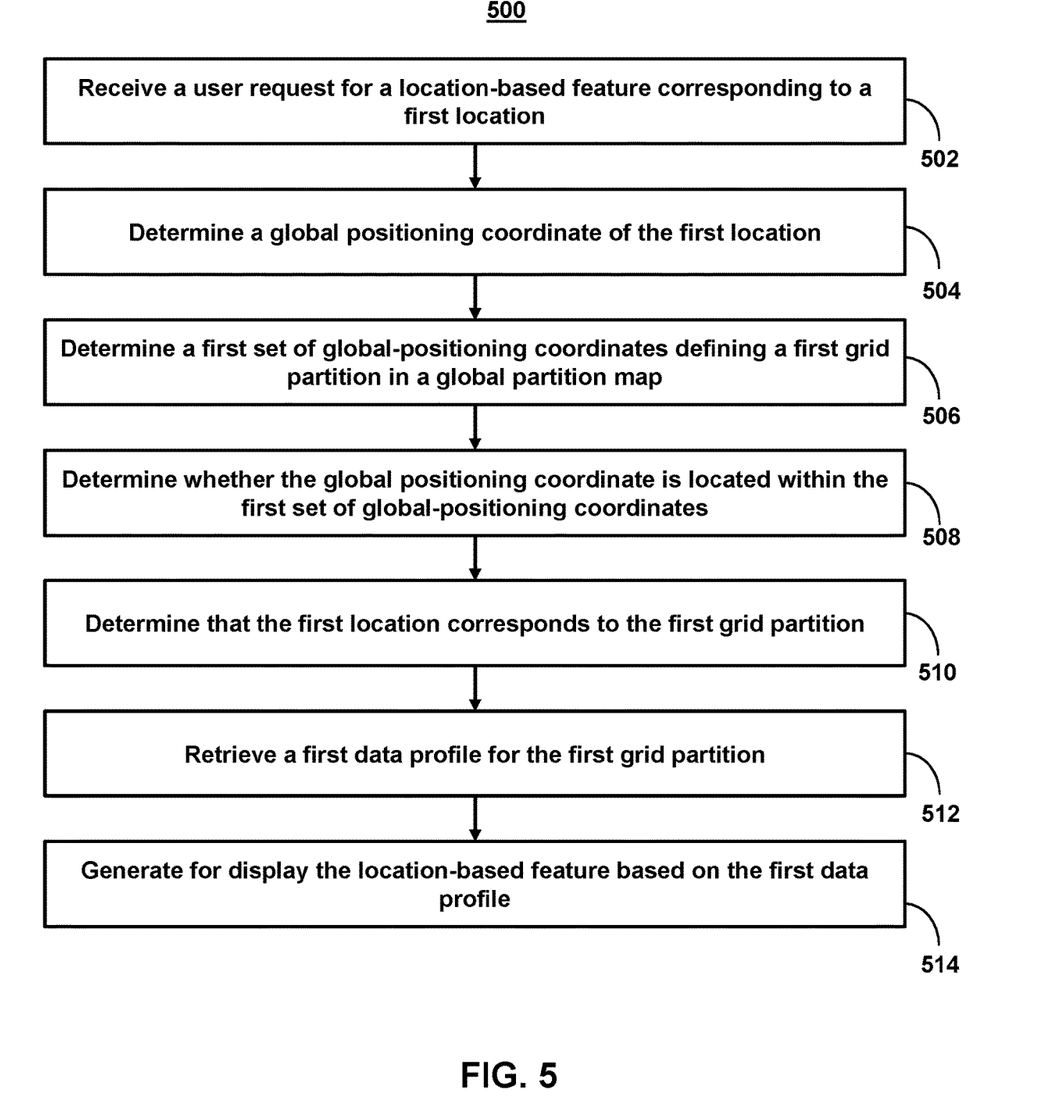
FIG. 5 shows a flowchart of steps for generating for display the location-based feature based on the first data profile in accordance with one or more embodiments.

FIG. 5 shows a flowchart of steps for generating for display the location-based feature based on the first data profile, in accordance with one or more embodiments. For example, process 500 may represent the steps taken by one or more devices as shown in FIG. 3 for generating one or more location-based features in FIG. 1.

At step 502, process 500 (e.g., via control circuitry of one or more devices in system 300 (FIG. 3)) receives a user request (e.g., via user interface 100 (FIG. 1)) for a location-based feature corresponding to a first location. For example, a user may request for location-based features and/or request information on a grid partition as discussed in FIG. 1. In some embodiments, the system may receive an alphanumeric code (e.g., assigned to a grid partition). The system may enter the code into a lookup table to identify the grid partition.

At step 504, process 500 (e.g., via control circuitry of one or more devices in system 300 (FIG. 3)) determines a global-positioning coordinate of the first location. For example, in response to the user request, the system may determine a global-positioning coordinate of a location. For example, in some embodiments, a location-based feature as described in user interface 100 (FIG. 1)), may determine whether or not a location is included within a grid partition (e.g., in order to determine whether or not to include information about the location in a data profile for the grid partition). For example, the system may receive a global-positioning coordinate from a global positioning satellite array. For example, the satellite array may be one of the global navigation satellite systems (GNSS) that provides geolocation and time information to a GPS receiver anywhere on or near the Earth where there is an unobstructed line of sight to four or more GPS satellites.

At step 506, process 500 (e.g., via control circuitry of one or more devices in system 300 (FIG. 3)) determines a first set of global-positioning coordinates defining a first grid partition in a global partition map. For example, in response to the user request, the system may determine a first set of global-positioning coordinates defining a first grid partition in a global partition map. In some embodiments, a shape of the first grid partition may correspond to a polygonal face of a spherical polyhedral. For example, in order to generate global partition mapping, the system may generate the spherical polyhedral corresponding to the Earth, wherein the spherical polyhedral has a plurality of polygonal faces corresponding to a surface area of the Earth. The system may then assign each of the plurality of polygonal faces to a respective grid partition of the first plurality of grid sub-partitions. The system may then determine the first plurality of sets of global-positioning coordinates defining each of the first plurality of grid sub-partitions. The system may display these coordinates in the interface of a GPS display device. For example, the system may display these coordinates in a GPS receiver (e.g., a device that is capable of receiving information from GNSS satellites and then to calculate the device's geographical position).

For example, the system may further partition each partition into respective sub-partitions, which have a substantially equal size and/or shape. Moreover, the shape of the sub-partition may be substantially equal to the shape of the initial partition. In some embodiments, the first grid partition comprises a first plurality of grid sub-partitions, wherein each of the first plurality of grid sub-partitions has a shape of the first grid partition. For example, by maintaining consistent shapes through various levels of magnification and/or partitioning, the system may generate a single, standardized mechanism for partitioning large (e.g., global) and small areas (e.g., regional) for further determinations. Moreover, due to the standardization, the partitions will not have biases and/or inconsistencies as the system scale from one level of magnification to another, biases and/or inconsistencies that are present in conventional systems.

At step 508, process 500 (e.g., via control circuitry of one or more devices in system 300 (FIG. 3)) determines whether the global-positioning coordinate is located within the first set of global-positioning coordinates. For example, the system may determine whether or not the global-positioning coordinate is located within the area formed by the set of global-positioning coordinates. In some embodiments, the system may retrieve a first plurality of sets of global-positioning coordinates defining a first plurality of grid sub-partitions, wherein each of the first plurality of grid sub-partitions has the shape of the first grid partition, and wherein determining whether the global-positioning coordinate is located within the first set of global-positioning coordinates comprises determining (e.g., using system 400 (FIG. 4)) which of the first plurality of sets of global-positioning coordinates the global-positioning coordinate is located within.

In some embodiments, the system may retrieve location information for the first location, wherein the location information is assigned to the first location by a governmental source (or other source). For example, the location information may be a government issued address. The system may then determine the global-positioning coordinate based on the location information, and the system may assign the global-positioning coordinate to the first location.

At step 510, process 500 (e.g., via control circuitry of one or more devices in system 300 (FIG. 3)) determines that the first location corresponds to the first grid partition. For example, in response to determining that the global-positioning coordinate is located within the first set of global-positioning coordinates, the system determines that the first location corresponds to the first grid partition. For example, in some embodiments, the system may aggregate data (e.g., value of a residence located in the grid partition) in order to compile a data profile (e.g., indicating a total value of residences in the grid partition) for the grid partition. As part of this process, the system may aggregate data about a plurality of locations with the grid partition. Furthermore, in some embodiments, the system may determine how much of the given location is attributable to the grid partition (e.g., as described in FIG. 7).

For example, the system may retrieve location information for a location region wherein boundaries of the location region are assigned by a governmental, commercial, or other source. The system may determine an overlap between the first grid partition and the boundaries of the location region. The system may then determine a portion of the location information to attribute to the first grid partition based on the overlap. The system may then update the first data profile based on the portion of the location information.

At step 512, process 500 (e.g., via control circuitry of one or more devices in system 300 (FIG. 3)) retrieves a first data profile for the first grid partition. For example, after establishing grid partitions that are globally consistent and temporally reliable, the system may begin aggregating data about those grid partitions. The aggregated data may then be used to implement location-based features that are also globally consistent and temporally reliable.

At step 514, process 500 (e.g., via control circuitry of one or more devices in system 300 (FIG. 3)) generates for display, in a user interface (e.g., user interface 100 (FIG. 1)), the location-based feature based on the first data profile. For example, as described in FIG. 1, the system may provide location-based features such as online exchange for reviewing information, trading securities, etc., based on securities based on grid partitions, news feed related to the grid partition, push notifications surrounding purchasing opportunities, travel alerts, or temporally relevant information about upcoming events in the grid partition, micro-blogging feeds related to the grid partition, and/or augmented reality, in conjunction with global-positioning systems, location sensors and geospatial data, for the grid partition.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, or in parallel or substantially simultaneously, to reduce lag or increase the speed of the system or method. Furthermore, it should be noted that any of the devices or equipment discussed in relation to FIG. 3 could be used to perform one of more of the steps in FIG. 5.

Figure 6:
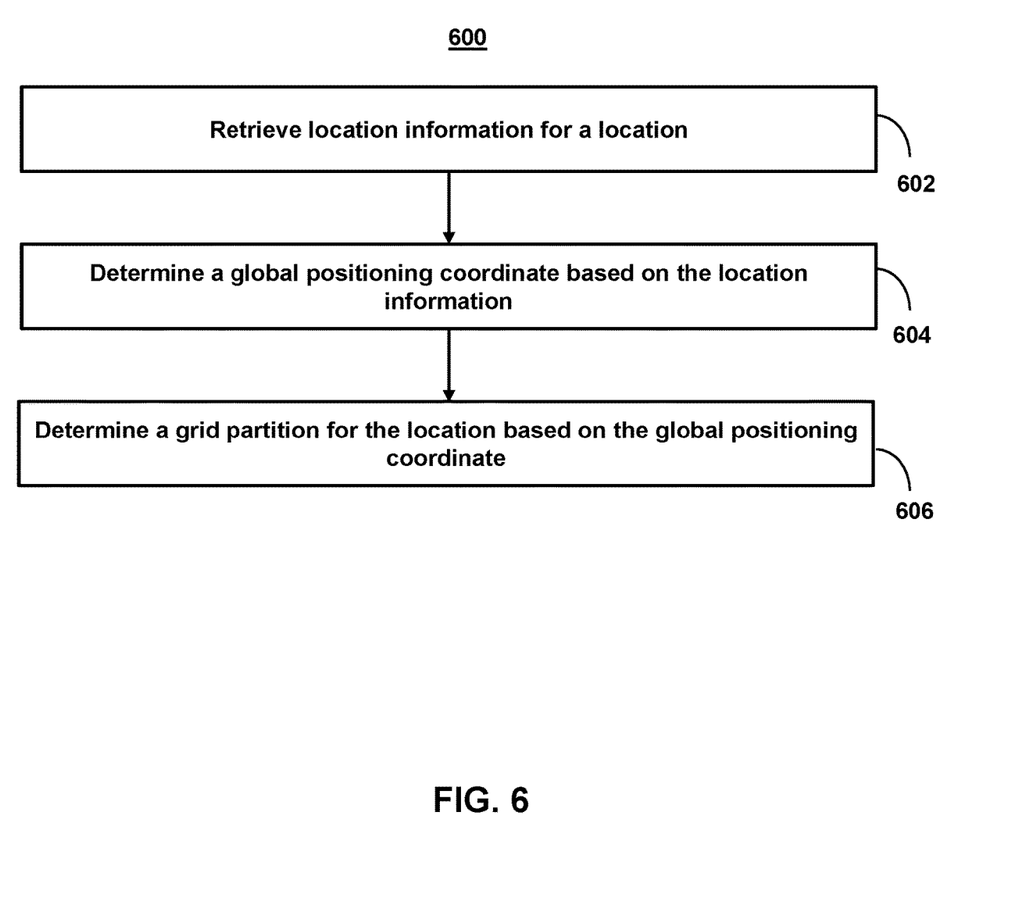
FIG. 6 shows a flowchart of steps for determining a grid partition for a location in accordance with one or more embodiments.

FIG. 6 shows a flowchart of steps for determining a grid partition for a location, in accordance with one or more embodiments. For example, process 600 may represent the steps taken by one or more devices as shown in FIG. 3 for generating one or more location-based features in FIG. 1.

At step 602, process 600 (e.g., via control circuitry of one or more devices in system 300 (FIG. 3)) retrieves location information for a location. For example, the system may retrieve location information for a first location, wherein the location information is assigned to the first location by a governmental or other source (e.g., a registered source). For example, location information may include an address as designated by a governmental (e.g., a governing body of a nation, state, or community) source. In some embodiments, the system may retrieve location information for a location region (e.g., a location containing several sub-locations), wherein boundaries of the location region are assigned by a governmental or other source. The system may determine an overlap between the first grid partition and the boundaries of the location region. The system may then determine a portion of the location information to attribute to the first grid partition based on the overlap. The system may then update the first data profile based on the portion of the location information.

At step 604, process 600 (e.g., via control circuitry of one or more devices in system 300 (FIG. 3)) determines a global-positioning coordinate based on the location information. For example, the system may convert this location information into a global-positioning coordinate. In some embodiments, the system may input the location information into a database listing global-positioning coordinates for different location information. The system may receive an output from the database that may include a global-positioning coordinate, which the system may then compare to the global-positioning coordinates of one or more grid partitions.

At step 606, process 600 (e.g., via control circuitry of one or more devices in system 300 (FIG. 3)) determines a grid partition for the location based on the global-positioning coordinate. For example, the system may compare the global-positioning coordinates of one or more grid partitions to determine a grid partition for the location. Alternatively or additionally, the output may indicate in which grid partition the location is situated. For example, the system (e.g., using system 400 (FIG. 4)) may recursively examine location information for various locations around the world and assign each location to a given grid partition. In such cases, the system may normalize this data in order to remove inconsistencies and discrepancies. Additionally or alternatively, the system may attribute portions of information and/or locations to a given grid partition (e.g., as described below in relation to FIG. 7).

In some embodiments, the system may further determine grid partitions (or the locations with a grid partition) at varying resolutions. For example, the system may retrieve a first plurality of sets of global-positioning coordinates defining a plurality of grid sub-partitions in the global partition map. Each grid partition may have an equal size (e.g., one-hundred square kilometers). Each of the first plurality of grid sub-partitions may have the same shape (e.g., a hexagon). Alternatively, the grid partitions may vary in shape in a given resolution and/or between resolutions. The system may then determine which of the plurality of sets of global-positioning coordinates the global-positioning coordinate is located within. Additionally, the system may further partition this first plurality of grid sub-partitions. For example, each of the first plurality of grid sub-partitions may be further partitionable into a second plurality of grid sub-partitions. The second plurality of grid sub-partitions may divide one grid partition of the first plurality of grid sub-partitions. For example, as described in FIG. 2, a ratio of a number of the second plurality of grid sub-partitions for each of the first plurality of grid sub-partitions may be seven to one. Additionally, each of the second plurality of grid sub-partitions has the shape of the first grid partition.

In some embodiments, the system may further distinguish between locations and/or information about a location in order to update a data profile about a grid partition. For example, in some embodiments, the system may update a data profile for a grid partition based on third-party data. However, the third-party data may be based on government sources and/or commercial and/or open sources that may have discrepancies and/or inconsistencies. Additionally, third party data may not be solely based on locations located in a grid partition. For example, third-party data may include average housing prices in a zip code, or a list of all home values based on location information. Accordingly, prior to use, the system may need to determine a portion of the third party data or the location information applicable to the grid partition.

For example, the system may retrieve third-party location information for a plurality of locations. The system may then determine a portion of the plurality of locations that correspond to the first grid partition. The system may then update the first data profile to include the portion of the plurality of locations that corresponds to the first grid partition. Alternatively or additionally, the system may retrieve third-party location information for a plurality of locations. The system may then determine a portion of the plurality of locations that corresponds to the first grid partition. The system may then update the first data profile based on the third-party location information corresponding to the portion of locations.

In some embodiments, the system may determine various quantitative or qualitative descriptions of a relationship of location, location information, and/or information about a location between adjoining grid partitions. For example, in some embodiments, the system may retrieve government sourced or third-party location information for one or more locations. The system may determine that one or more locations are on a boundary between a first grid partition and a second grid partition. The system may then determine a grid ratio between the first grid partition and the second grid partition for the second location. The system may then update the first data profile based with the third-party location information based on the grid ratio.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 3 could be used to perform one or more of the steps in FIG. 6.

Figure 7:
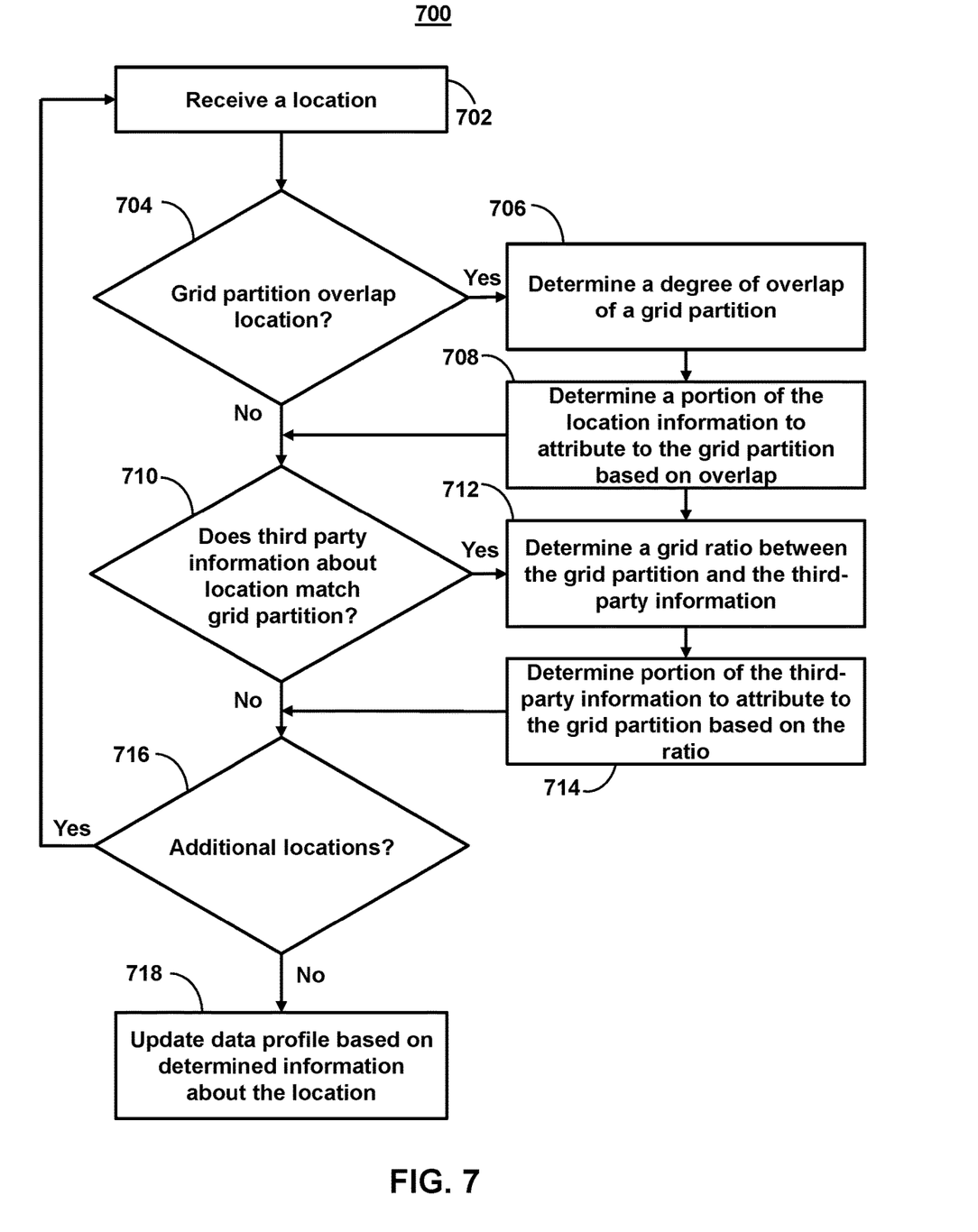
FIG. 7 shows a flowchart of steps for updating a data profile for a grid partition based on location information in accordance with one or more embodiments.

FIG. 7 shows a flowchart of steps for updating a data profile for a grid partition based on location information, in accordance with one or more embodiments. For example, process 700 may represent the steps taken by one or more devices as shown in FIG. 3 for generating one or more location-based features in FIG. 1.

At step 702, process 700 (e.g., via control circuitry of one or more devices in system 300 (FIG. 3)) receives a location. For example, in some embodiments, the system may update a data profile about a grid partition based on one or more locations located within the gird portion. In some embodiments, the system may determine that a location is located within a location based on process 500 (FIG. 5) or process 600 (FIG. 6). For example, the system may determine information about the locations (e.g., a market value, demographic information, risk information, etc.) about the location and update the data profile for the grid partition with that information.

At step 704, process 700 (e.g., via control circuitry of one or more devices in system 300 (FIG. 3)) determines whether the location information overlaps two grid partitions. For example, in some embodiments, a single location (e.g., identified by location information such as a government issued mailing address) may span a boundary of multiple grid partitions. In such cases, the system may determine that the location is a "location region." The system may then determine a portion of the location information located in each grid partition. If process 700 determines that the location overlaps, process 700 proceeds to step 706. If process 700 determines that the location is not a region, process 700 proceeds to step 710.

At step 706, process 700 (e.g., via control circuitry of one or more devices in system 300 (FIG. 3)) determines an overlap with a grid partition. For example, the system may divide the location region using one or more qualitative or quantitative assessments. In some embodiments, the system may divide the location region based on a ratio of the location region located in each grid partition. In some embodiments, the system may divide the location region based on structures (or monetary values thereof), landmarks, and/or topologically formations in the location region. For example, the system may determine that the location is on a boundary between a first grid partition and a second grid partition. The system may then determine a grid ratio between the first grid partition and the second grid partition for the second location. The system may then update the first data profile based with the third-party location information based on the grid ratio.

At step 708, process 700 (e.g., via control circuitry of one or more devices in system 300 (FIG. 3)) determines a portion of the location information to attribute to the grid partition based on overlap. For example, based on the ration determined in step 706, the system may record a portion of the location information to attribute to each grid partition. This portion may then be used to determine what information (and to what degree) the data profile for each grid partition is updated. For example, if a location region corresponds to a building with a set value, and the system determines that the location region is equally divided between the two grid partitions, the system may attribute half of the value of the building to each grid partition.

At step 710, process 700 (e.g., via control circuitry of one or more devices in system 300 (FIG. 3)) determines whether third-party information relates to the location. For example, the system may determine whether the basis of the third party information (e.g., a zip code) matches the boundaries of the grid partition. If process 700 determines that third-party information relates to the location, process 700 proceeds to step 712. If process 700 determines that third-party information does not relate to the location, process 700 proceeds to step 716.

At step 712, process 700 (e.g., via control circuitry of one or more devices in system 300 (FIG. 3)) determine a grid ratio between the grid partition and the third-party information. For example, the system may determine how third-party information is related to the location. For example, in some embodiments, the system may retrieve information about a location (e.g., value, demographics, etc.). In such cases, information about broad value, demographics, etc. may be based on government-sourced information that may have been calculated using location information. Before this information is used to update a data profile for a grid partition in which the location is located, the system may determine whether the location information refers only to the location (or locations within the grid partition). To do so, the system may retrieve third-party location information for a location, determine a grid ratio between the grid partition and the location information, and update the data profile for the grid partition with the third-party location information based on the grid ratio.

At step 714, process 700 (e.g., via control circuitry of one or more devices in system 300 (FIG. 3)) determine portion of the third-party information to attribute to the grid partition based on the ratio. For example, the system may determine how a portion of the third-party information relates to the location. For example, if the system determines that the third party location information refers to locations outside the grid partition, the system may determine a portion of the location information to attribute to only the grid partition.

At step 716, process 700 (e.g., via control circuitry of one or more devices in system 300 (FIG. 3)) determines whether there are additional locations. For example, the system may iteratively calculate information about locations within the grid partition to determine how to update a data profile for the grid partition. If process 700 determines that there are additional locations, process 700 returns to step 702. If process 700 determines that there are no additional locations, process 700 proceeds to step 718.

At step 718, process 700 (e.g., via control circuitry of one or more devices in system 300 (FIG. 3)) updates a data profile based on information about the location. For example, the system may update the data profile with portions of information as determined by process 700.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 3 could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment. The prevent invention may also encompass additional applications that as the use of grid partitions for risk management, battlespace allocation (e.g., in a defense environment), etc.

The present techniques will be better understood with reference to the following enumerated embodiments:

1. A method of generating location-based features using partition mapping, the method comprising: receiving a user request for a location-based feature corresponding to a first location; in response to the user request: determining a global-positioning coordinate of the first location; and determining a first set of global-positioning coordinates defining a first grid partition in a global partition map; determining whether the global-positioning coordinate is located within the first set of global-positioning coordinates; in response to determining that the global-positioning coordinate is located within the first set of global-positioning coordinates; determining that the first location corresponds to the first grid partition; retrieving a first data profile for the first grid partition; and generating for display, in a user interface, the location-based feature based on the first data profile.

2. The method of embodiment 1, wherein a shape of the first grid partition corresponds to a polygonal face of a spherical polyhedral, and/or wherein the first grid partition is further partitioned into respective sub-partitions, each respective sub-partition having a substantially equal size, shape, and/or number of physical attributes.

3. The method of embodiment 2 or 3, further comprising retrieving a first plurality of sets of global-positioning coordinates defining a first plurality of grid sub-partitions, wherein each of the first plurality of grid sub-partitions has the shape of the first grid partition, and wherein determining whether the global-positioning coordinate is located within the first set of global-positioning coordinates comprises determining which of the first plurality of sets of global-positioning coordinates the global-positioning coordinate is located within.

4. The method of embodiment 4, wherein each of the first plurality of grid sub-partitions is further partitionable into a second plurality of grid sub-partitions, and wherein each of the second plurality of grid sub-partitions has the shape of the first grid partition.

5. The method of embodiment 4, wherein a ratio of a number of the second plurality of grid sub-partitions for each of the first plurality of grid sub-partitions is seven to one.

6. The method of any one of embodiments 3-5, further comprising: generating the spherical polyhedral corresponding to the Earth, wherein the spherical polyhedral has a plurality of polygonal faces corresponding to a surface area of the Earth; and assigning each of the plurality of polygonal faces to a respective grid partition of the first plurality of grid sub-partitions; and determining the first plurality of sets of global-positioning coordinates defining each of the first plurality of grid sub-partitions.

7. The method of any one of embodiments 1-6, wherein determining the global-positioning coordinate of the first location, comprises: retrieving location information for the first location, wherein the location information is assigned to the first location by a governmental or registered source; determining the global-positioning coordinate based on the location information; and assigning the global-positioning coordinate to the first location.

8. The method of any one of embodiments 1-7, further comprising: retrieving location information for a location region, wherein boundaries of the location region are assigned by a governmental, registered, or other source; determining an overlap between the first grid partition and the boundaries of the location region; determining a portion of the location information to attribute to the first grid partition based on the overlap; and updating the first data profile based on the portion of the location information.

9. The method of any one of embodiments 1-8, further comprising: retrieving third-party location information for a plurality of locations; determining a portion of the plurality of locations that corresponds to the first grid partition; and updating the first data profile based on the third-party location information corresponding to the portion of locations.

10. The method of any one of embodiments 1-9, further comprising: retrieving third-party location information for a plurality of locations; determining a portion of the plurality of locations that corresponds to the first grid partition; and updating the first data profile to include the portion of the plurality of locations that correspond to the first grid partition.

11. The method of any one of embodiments 1-10, further comprising: retrieving third-party location information for a second location; determining that the second location is on a boundary between a first grid partition and a second grid partition; determining a grid ratio between the first grid partition and the second grid partition for the second location; and updating the first data profile based with the third-party location information based on the grid ratio.

12. The method of any one of embodiments 1-11, further comprising: determining an elevation metric for the first grid partition; and updating the first data profile to include the elevation metric for the first grid partition.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing of any of embodiments 1-12.

What is claimed is:

1. A system for generating location-based features using partition mapping, the system comprising:
   cloud-based memory configured to store a first data profile for a first planar grid partition;
   cloud-based control circuitry configured to:
      receive a user request for a location-based feature corresponding to a first location;
      retrieve location information for the first location, wherein the location information is assigned to the first location by a registered source;
      determine a global-positioning coordinate based on the location information;
      assign the global-positioning coordinate to the first location;
      determine a first set of global-positioning coordinates defining the first planar grid partition in a global partition map,
      wherein a shape of the first planar grid partition approximating a planar polygonal face as projected from the spherical polyhedral surface of Earth;
      determine whether the global-positioning coordinate of the first location is located within the first set of global-positioning coordinates;
      determine that the first location corresponds to the first planar grid partition in response to determining that the global-positioning coordinate is located within the first set of global-positioning coordinates;
      retrieve the first data profile for the first planar grid partition; and
   generate for display, in a user interface, the location-based feature based on the first data profile.

2. A method of generating location-based features using partition mapping, the method comprising:
   receiving, using control circuitry, a user request for a location-based feature corresponding to a first location;
   in response to the user request:
      determining, using the control circuitry, a global-positioning coordinate of the first location; and
      determining, using the control circuitry, a first set of global-positioning coordinates defining a first planar grid partition in a global partition map,
      wherein the first planar grid partition comprises a first plurality of planar grid sub-partitions,
      wherein each of the first plurality of planar grid sub-partitions has a shape of the first planar grid partition, and
      wherein the shape of the first planar grid partition approximating a planar polygonal face as projected from the spherical polyhedral surface of Earth;
   determining, using the control circuitry, whether the global-positioning coordinate of the first location is located within the first set of global-positioning coordinates;
   in response to determining that the global-positioning coordinate of the first location is located within the first set of global-positioning coordinates,
   determining, using the control circuitry, that the first location corresponds to the first planar grid partition;
   retrieving, using the control circuitry, a first data profile for the first planar grid partition; and
   generating for display, in a user interface, the location-based feature based on the first data profile.

3. The method of claim 2, further comprising retrieving a first plurality of sets of global-positioning coordinates defining the first plurality of planar grid sub-partitions in the global partition map, and
  wherein determining whether the global-positioning coordinate of the first location is located within the first set of global-positioning coordinates comprises determining which of the first plurality of sets of global-positioning coordinates the global-positioning coordinate is located within.

4. The method of claim 3, wherein each of the first plurality of planar grid sub-partitions is further partitionable into a second plurality of planar grid sub-partitions, and
  wherein each of the second plurality of grid sub-partitions has the shape of the first planar grid partition.

5. The method of claim 4, wherein a ratio of a number of the second plurality of planar grid sub-partitions for each of the first plurality of planar grid sub-partitions is seven to one.

6. The method of claim 3, further comprising:
  generating the spherical polyhedral having a shape that corresponds to a shape of topologically spherical Earth when the spherical polyhedral is projected on the surface of the Earth,
  wherein the spherical polyhedral has a plurality of polygonal faces, each of the plurality of polygonal faces has a surface area,
  wherein a sum of the surface areas of the plurality of polygonal faces corresponds to a surface area of the topologically spherical Earth;
  assigning each of the plurality of polygonal faces to a respective planar grid partition of the first plurality of planar grid sub-partitions; and
  determining the first plurality of sets of global-positioning coordinates defining each of the first plurality of planar grid sub-partitions.

7. The method of claim 2, wherein determining the global-positioning coordinate of the first location, comprises:
  retrieving location information for the first location, wherein the location information is assigned to the first location by a registered source;
  determining the global-positioning coordinate based on the location information; and
  assigning the global-positioning coordinate to the first location.

8. The method of claim 2, further comprising:
  retrieving location information for a location region, wherein boundaries of the location region are assigned by a registered source;
  determining an overlap between the first planar grid partition and the boundaries of the location region;
  determining a portion of the location information to attribute to the first planar grid partition based on the overlap; and
  updating the first data profile based on the portion of the location information.

9. The method of claim 2, further comprising:
  retrieving third-party location information for a plurality of locations;
  determining a portion of the plurality of locations that correspond to the first planar grid partition; and
  updating the first data profile to include the portion of the plurality of locations that corresponds to the first planar grid partition.

10. The method of claim 2, further comprising:
  retrieving third-party location information for a plurality of locations;
  determining a portion of the plurality of locations that corresponds to the first planar grid partition; and
  updating the first data profile based on the third-party location information corresponding to the portion of locations.

11. The method of claim 2, further comprising:
  retrieving third-party location information for a second location;
  determining that the second location is on a boundary between a first planar grid partition and a second planar grid partition;
  determining a grid ratio between the first planar grid partition and the second planar grid partition for the second location; and
  updating the first data profile based with the third-party location information based on the grid ratio.

12. A non-transitory computer-readable medium comprising instructions that, when executed by one or more processors, cause operations comprising:
  receiving a user request for a location-based feature corresponding to a first location;
  determining a global-positioning coordinate of the first location;
  determining a first set of global-positioning coordinates defining a first planar grid partition in a global partition map,
  wherein the first planar grid partition comprises a first plurality of planar grid sub-partitions,
  wherein each of the first plurality of planar grid sub-partitions has a shape of the first planar grid partition, and
  wherein the shape of the first planar grid partition approximating a planar polygonal face as projected from the spherical polyhedral surface of Earth;
  determining whether the global-positioning coordinate of the first location is located within the first set of global-positioning coordinates;
  in response to determining that the global-positioning coordinate of the first location is located within the first set of global-positioning coordinates,
  determining that the first location corresponds to the first planar grid partition;
  retrieving a first data profile for the first planar grid partition; and
  generating for display, in a user interface, the location-based feature based on the first data profile.

13. The non-transitory computer-readable medium of claim 12, wherein the instructions further cause operations comprising retrieving a first plurality of sets of global-positioning coordinates defining the first plurality of planar grid sub-partitions in the global partition map, and
  wherein determining whether the global-positioning coordinate of the first location is located within the first set of global-positioning coordinates comprises determining which of the first plurality of sets of global-positioning coordinates the global-positioning coordinate is located within.

14. The non-transitory computer-readable medium of claim 13, wherein each of the first plurality of planar grid sub-partitions is further partitionable into a second plurality of planar grid sub-partitions,
  wherein each of the second plurality of planar grid sub-partitions has the shape of the first planar grid partition, and wherein a ratio of a number of the second plurality of planar grid sub-partitions for each of the first plurality of planar grid sub-partitions is seven to one.

15. The non-transitory computer-readable medium of claim 13, wherein the instructions further cause operations comprising:
generating the spherical polyhedral having a shape that corresponds to a shape of topologically spherical Earth when the spherical polyhedral is projected on the surface of the Earth,
wherein the spherical polyhedral has a plurality of polygonal faces, each of the plurality of polygonal faces has a surface area,
wherein a sum of the surface areas of the plurality of polygonal faces corresponds to a surface area of the topologically spherical Earth;
assigning each of the plurality of polygonal faces to a respective planar grid partition of the first plurality of planar grid sub-partitions; and
determining the first plurality of sets of global-positioning coordinates defining each of the first plurality of planar grid sub-partitions.

16. The non-transitory computer-readable medium of claim 12, wherein determining the global-positioning coordinate of the first location, comprises:
retrieving location information for the first location, wherein the location information is assigned to the first location by a registered source;
determining the global-positioning coordinate based on the location information; and
assigning the global-positioning coordinate to the first location.

17. The non-transitory computer-readable medium of claim 12, wherein the instructions further cause operations comprising:
retrieving location information for a location region, wherein boundaries of the location region are assigned by a registered source;
determining an overlap between the first planar grid partition and the boundaries of the location region;
determining a portion of the location information to attribute to the first planar grid partition based on the overlap; and
updating the first data profile based on the portion of the location information.

18. The non-transitory computer-readable medium of claim 12, wherein the instructions further cause operations comprising:
retrieving third-party location information for a plurality of locations;
determining a portion of the plurality of locations that correspond to the first planar grid partition; and
updating the first data profile to include the portion of the plurality of locations that corresponds to the first planar grid partition.

19. The non-transitory computer-readable medium of claim 12, wherein the instructions further cause operations comprising:
retrieving third-party location information for a plurality of locations;
determining a portion of the plurality of locations that corresponds to the first planar grid partition; and
updating the first data profile based on the third-party location information corresponding to the portion of locations.

20. The non-transitory computer-readable medium of claim 12, wherein the instructions further cause operations comprising:
retrieving third-party location information for a second location;
determining that the second location is on a boundary between a first planar grid partition and a second planar grid partition;
determining a grid ratio between the first planar grid partition and the second planar grid partition for the second location; and
updating the first data profile based with the third-party location information based on the grid ratio.

21. The method of claim 6, wherein each of the plurality of polygonal faces of the spherical polyhedral, which is projected on the surface of the Earth, includes nonplanar surface.

22. The method of claim 6, wherein a degree to which each of the plurality of polygonal faces of the spherical polyhedral is nonplanar is based on a size of the associated polygonal face of the spherical polyhedral that is projected on the surface of the Earth.

* * * * *